United States Patent [19]

Blumberg et al.

[11] 3,903,247

[45] Sept. 2, 1975

[54] CLEANING OF PHOSPHORIC ACID

[75] Inventors: Ruth Blumberg; Avraham Matitiahu Baniel, both of Haifa, Israel

[73] Assignee: IMI(TAMI) Institute for Research and Development, Haifa, Israel

[22] Filed: July 5, 1974

[21] Appl. No.: 485,804

[30] Foreign Application Priority Data

July 18, 1973 Israel.......................................... 4277

[52] U.S. Cl. ................................................. 423/321
[51] Int. Cl.² ......................................... C01B 25/16
[58] Field of Search......................... 423/321, 321 S

[56] References Cited
UNITED STATES PATENTS

| | | | |
|---|---|---|---|
| 1,929,443 | 10/1933 | Milligan............................. | 423/321 |
| 3,318,661 | 5/1967 | Schallert et al..................... | 423/321 |
| 3,367,738 | 2/1968 | Schallert et al..................... | 423/321 |
| 3,556,739 | 1/1971 | Baniel et al........................ | 423/321 |
| 3,573,005 | 3/1971 | Baniel et al........................ | 423/321 |

FOREIGN PATENTS OR APPLICATIONS 685,010   4/1964   Canada.............................. 423/321

*Primary Examiner*—Oscar R. Vertiz
*Assistant Examiner*—Eugene T. Wheelock
*Attorney, Agent, or Firm*—Wallenstein, Spangenberg, Hattis & Strampel

[57] ABSTRACT

Cleaning of phosphoric acid. An aqueous phosphoric acid starting solution is extracted with a mixture of 75–95% by weight of at least one dialkyl ether in which each alkyl radical has 2–5 carbon atoms and 5–25% by weight of at least one aliphatic alcohol having 3–8 carbon atoms. The extract is heated to cause phase separation and an aqueous phase is withdrawn as product.

5 Claims, No Drawings

CLEANING OF PHOSPHORIC ACID

The present invention relates to the purification of phosphoric acid.

In one of its applications the invention is suitable for extracting phosphoric acid from technical-grade phosphoric acid, i.e. an aqueous phorphoric acid, usually manufactured by the decomposition of rock phosphate with sulfuric acid, having an $H_3PO_4$ concentration of not less than 35%.

Another application of the invention concerns the case where it is desirable to obtain a small quantity of high purity phosphoric acid from a good technical-grade feed acid. In such a case the main problem is to maintain the concentrations of the clean and residual acids without raising substantially the impurity level in the residual acid, so that the latter can still be classified as good technical-grade acid.

It has already been suggested that a purer phosphoric acid may be recovered from technical-grade phosphoric acid by extraction with organic solvents, whereby $H_3PO_4$ is extracted and water and impurities are left in the residue. Many widely different solvents have been stated to be suitable as extracting solvents, and so long as a solvent fulfilled the minimum conditions for an extracting solvent, namely, that it should be capable of extracting the phosphoric acid from the aqueous solution thereof and that it should be effectively immiscible with water, there appears to have been no preference for any other particular properties in the solvent used. Recovery of a purified phosphoric acid from the solvent extract was in accordance with these known processes either by way of back extraction with water or evaporation of the solvent. The former route has the disadvantage of leading to dilute phosphoric acid while in the latter case the extra energetic requirements for the evaporation constitute a burden on the economics of the process.

In the specifications of our British Pat. Nos. 1,112,033, 1,142,719, 1,199,041, 1,199,042, 1,207,272 and 1,240,285, of our U.S. Pat. Nos. 3,573,005 and 3,556,739, as well as in the specifications of corresponding patents in other countries, we have described a process for recovering phosphoric acid from an aqueous solution thereof, which comprises treating the solution with an extracting solvent capable of extracting phosphoric acid from an aqueous solution thereof having a concentration of $H_3PO_4$ above a threshold value of 35%, whose capacity for extracting phosphoric acid from water varies inversely with temperature (negative temperature gradient of the phosphoric acid dissolution capacity) and which does not extract phosphoric acid from an aqueous solution thereof having a concentration below a threshold value of 35%, the temperature of the treatment being low enough for the formation of a clear homogeneous extract phase distinct from a residual aqueous phase, separating the extract phase from the aqueous phase, raising the temperature of the extract phase to that at which it separates into a lower layer containing phosphoric acid and an upper layer containing solvents and separating the lower layer from the upper layer. In accordance with that process it is possible, if desired, to add a small amount of water at the time of heating whereby the phase separation may be improved. It is furthermore possible to add to the technical acid prior to extraction sulfuric acid in an amount of 0.5 to 5% by weight of the crude phosphoric acid in order to improve this way the extraction of the phosphoric acid from the aqueous phase. (See our British patent specification No. 1,199,041).

The preferred solvent used in accordance with our above process are ethers of the formula $R-O-R_1$ in which R and $R_1$ are the same or different aliphatic radicals containing 2–5 carbon atoms such as, for example, diethyl, diisopropyl, di-n-butyl, isopropyl-n-butyl, di-n-amyl and diisoamylether.

While the purification in accordance with our above method gives excellent results as regards the purity of the product acid, the method has a certain disadvantage in that a relatively high proportion of the original phosphoric acid present in the crude acid is not utilized. Thus, where the feed acid contains at least 70% by weight of $H_3PO_4$, about 60% of the acid is extracted and recovered as pure acid while 40% of the phosphoric acid originally present in the technical-grade acid is left behind in the residual acid. With more dilute feed acids this ratio of pure acid to residual acid is even more unfavourable.

This disadvantage has already been recognized by us before, and in accordance with our British patent specification No. 1,199,041 the residual acid left behind after extraction of phosphoric acid into the solvent and removal of the solvent phase, is acidified by the addition of sulfuric acid in an amount from 30 to 100% by weight of $H_3PO_4$ and the resulting mixture is subjected to a further extraction with an organic solvent of the kind specified, preferably the same solvent that is used for the first extraction. By this operation one obtains a mixture of sulfuric and phosphoric acids with the former prevailing. It has been suggested to recycle this mixture to the stage of the decomposition of the rock phosphate, but this has turned out to be impracticable. Also there has so far not been found any other commercial outlet for this mixture so that this form of the recovery of additional $P_2O_5$ values from the residual acid has turned out to be of limited practical value.

In view of the above there remains the problem of a more economic purification of wet process phosphoric acid with better recovery, while retaining the advantages inherent in our process described in the above-mentioned British and U.S. patent specifications.

In accordance with the present invention it has surprisingly been found that the proportion of the extracted phosphoric acid can be substantially increased by using as solvent an ether of the formula $R-O-R_1$ in which R and $R_1$ are the same or different aliphatic radicals having 2–5 carbon atoms and admixing such ether with an aliphatic alcohol of 3–8 carbon atoms in a relative proportion of 5–25% by weight. These alcohols per se have not the properties which characterize solvents used in accordance with our above-mentioned British patent specifications and can therefore in themselves not be used in accordance with that process. In other words, these alcohols as such can only be used for the classical extraction process according to which the resulting extract has to be worked up by back-extraction or evaporation. It was therefore unexpected to find in accordance with the present invention that the incorporation of a substantial yet limited proportion of such an alcohol in an ether as defined above increases the quantitative extraction capacity of the resultant solvent mixture while the mixture retains the same qualitative behaviour vis-a-vis an aqueous phosphoric acid solution and a negative temperature gradient of the phosphoric acid dissolution capacity, which characterize the above ethers when used in pure state.

One of the disadvantages of the use of a pure aliphatic alcohol of the kind specified for the extraction of phosphoric acid is that a relatively high proportion of water is co-extracted with phosphoric acid. This co-extraction together with the fact that water is used for back-extraction eventually leads to a rather diluted product. This shortcoming, as mentioned above, is overcome by conducting the extraction and the release of the product acid from the extract by means of a selected group of solvents in accordance with our above-mentioned British and U.S. patent specifications, and in this way the amount of co-extracted water is minimized. However, low yield is inherent in this minimization and one is thus faced with two prima facie incompatible requirements, namely, on the one hand to reduce the amount of co-extracted water and thereby to obtain a more concentrated product in a low yield, or, on the other hand, to increase this amount and thereby to recover more $P_2O_5$. So far these two incompatible requirements could not be bridged.

In accordance with the present invention it has surprisingly been found that the effect of the addition of the alcohol to the ether provides a satisfactory bridge between these two requirements and that while on the one hand the degree of extraction of phosphoric acid is improved, on the other hand the increase of the amount of co-extracted water is smaller than would be expected from an arithmetic combination of the individual water extraction capacities of the alcohol and ether. At the same time the negative temperature gradient of the phosphoric acid dissolution capacity is retained.

The invention thus provides a process for recovering phosphoric acid from an aqueous starting solution thereof which comprises treating the solution with a mixed solvent containing 75–95% by weight of an at least one ether $R—O—R_1$ in which R and $R_1$ are the same or different aliphatic radicals having 2–5 carbon atoms and 5–25% by weight of an aliphatic alcohol having 3–8 carbon atoms, the temperature of the extraction being low enough for the formation of a clear homogeneous extract phase distinct from a residual aqueous phase, separating the extract phase from the aqueous phase, raising the temperature of the extract phase and adding some water so that the extract separates into a lower layer containing phosphoric acid and an upper layer containing solvent, and separating the lower layer from the upper layer.

The extraction temperature depends, among others, on the ether used. As a rule, it will be within the range of −5° to 80°C and in many cases it will not exceed 40°C.

The starting solution may be technical-grade phosphoric acid or alternatively a residual acid solution remaining after a first extraction of a technical-grade phosphoric acid with an ether $R—O—R_1$ in which R and $R_1$ are the same or different aliphatic radicals with 2–5 carbon atoms.

The invention is illustrated by the following Examples to which it is not limited, all percentages being by weight.

EXAMPLE 1

This Example shows the effect of admixture of alcohols with isopropylethers (IPE) on the extraction of phosphoric acid.

Aliquots of technical-grade phosphoric acid were extracted at 10°C with pure IPE and with mixtures of IPE with various alcohols. The results of these experiments are summarised in the following Table I which shows that the addition of various alcohols improves substantially the distribution coefficient of $H_3PO_4$ in favour of the organic phase and this effect is in particular marked at low concentrations. Thus, by way of example, it is seen that with pure IPE and a $H_3PO_4$ of 64.5 the distribution coefficient is 0.05. With the addition of n-butanol, n-hexanol and n-octanol the distribution coefficient for similar concentrations of the starting $H_3PO_4$ varies between 0.48 to 0.64, i.e. is about 10 to 13 times as high.

TABLE I $H_3PO_4$ extraction (at 10°C) with IPE containing various alcohols

| Modifier | Concentrations of $H_3PO_4$ in wt. % | | Distribution Coefficient |
|---|---|---|---|
| | In aq. phase | In org. phase | |
| None (pure IPE) | 64.5 | 3.6 | 0.05 |
| | 65.8 | 40.1 | 0.61 |
| | 66.6 | 41.0 | 0.62 |
| | 69.7 | 45.2 | 0.65 |
| | 71.7 | 49.0 | 0.68 |
| 10% n-BuOH | 51.8 | 3.1 | 0.06 |
| | 62.6 | 36.4 | 0.58 |
| 20% n-BuOH | 44.2 | 4.7 | 0.10 |
| | 54.7 | 15.6 | 0.28 |
| | 62.3 | 39.8 | 0.64 |
| 13.3% n-Hexanol | 45.3 | 0.93 | 0.02 |
| | 56.2 | 6.75 | 0.12 |
| | 63.7 | 34.0 | 0.53 |
| 16.2% n-Octanol | 46.2 | 0.81 | 0.02 |
| | 56.6 | 6.6 | 0.12 |
| | 64.6 | 31.2 | 0.48 |

EXAMPLE 2

The procedure of Example 1 was repeated using this time di-n-butyl ether ($nBu_2O$), the extraction being carried out at room temperature. The results are summed up in the following Table II and it is seen that addition of various alcohols improves the distribution coefficient of $H_3PO_4$ in favour of the organic phase.

TABLE II $H_3PO_4$ extraction at room temperature with $nBu_2O$ containing various alcohols

| Modifier | Concentrations of $H_3PO_4$ in wt. % | | Distribution Coefficient |
|---|---|---|---|
| | In aq. phase | In Org. phase | |
| None (pure $nBu_2O$) | 73 | 0.16 | 0.002 |
| | 74.6 | 0.84 | 0.01 |
| | 81 | 36.3 | 0.45 |
| 6.6% i-PrOH | 46.7 | 4.72 | 0.10 |
| | 57.8 | 10.1 | 0.18 |
| | 69.3 | 16.1 | 0.23 |
| | 73.2 | 22.9 | 0.31 |
| 10% n-BuOH | 57.0 | 1.1 | 0.02 |
| | 67.2 | 7.1 | 0.11 |
| | 74.7 | 28.5 | 0.38 |
| 15% n-Hexanol | 57.8 | 2.3 | 0.04 |
| | 69.0 | 10.0 | 0.15 |
| | 76.9 | 28.6 | 0.37 |
| 13.3% n-Octanol | 57.3 | 1.1 | 0.02 |
| | 68.8 | 6.7 | 0.10 |
| | 76.7 | 25.4 | 0.33 |

EXAMPLE 3

A solvent mixture consisting of 90% by weight of isopropylether (IPE) and 10% by weight of n-butyl alcohol was used for the cleaning of technical-grade wet process phosphoric acid. Experiments were performed at 0°C and 10°C and in each case the performance of the mixture was compared with that of the pure ether.

The procedure was as follows:

About 80 g of phosphoric acid (67.5% by weight of $H_3PO_4$) were brought in contact with the solvent in separatory funnels in two stages. At first the acid was contacted with 60 ml of solvent and after shaking and separation the resulting aqueous phase was contacted with 34 ml of fresh solvent. After shaking the phases were separated and analyzed. The calculation of the split of $H_3PO_4$ (% extracted) was based on the $P_2O_5$ of the initial and final aqueous phase.

TABLE III

| Temp. | Solvent used | Aq. phase in Quantity g | Aq. phase in Conc. % $H_3PO_4$ | Aq. phase out Quantity g | Aq. phase out Conc. % $H_3PO_4$ | Split of $H_3PO_4$ |
|---|---|---|---|---|---|---|
| 0°C | IPE | 80 | 67.5 | 58 | 56.0 | 40 |
|  | Mixture of 90% IPE and 10% n-BuOH | 80.3 | 67.5 | 47.7 | 54.5 | 52 |
| 10°C | IPE | 80 | 67.5 | 68.7 | 60.5 | 23 |
|  | Mixture of 90% IPE and 10% n-BuOH | 80 | 67.5 | 51.5 | 58.0 | 45 |

EXAMPLE 4

100 g of 56.5% by weight of $H_3PO_4$ were contacted at 0°C in separatory funnels with four consecutive portions of 37.5 g of a mixture of 80% isopropylether and 20% n-butanol. After each contact the phases separated and all organic phases were combined.

The combined organic phases were heated to 40°C and water was added in three consecutive portions of 7.5 g each. A clean aqueous phosphoric acid was obtained containing 54% by weight of $H_3PO_4$ and representing about 60.8% of the initial quantity of $H_3PO_4$ contained in the feed acid. The residual acid contained 38.8% by weight of $H_3PO_4$. In a similar experiment with IPE alone there was only a negligible extraction of $H_3PO_4$.

EXAMPLE 5

A wet process phosphoric acid, derived from Florida phosphate rock, was cleaned in two operational stages as follows in a continuous bench scale unit:

First operational stage:

Wet process phosphoric acid containing 75% by weight of $H_3PO_4$ was fed at a rate of 3 l/hr countercurrently to isopropylether which was fed at a rate of 12 l/hr. The temperature of extraction was 11–13°C. The extract was heated to 30°C and 1.8 kg of water was added. Clean acid containing 68% by weight of $H_3PO_4$ was withdrawn at a rate of 2.8 l/hr and residual acid containing 59% by weight of $H_3PO_4$ was withdrawn at a rate of 1.9 l/hr.

Second operational stage:

The residual acid, containing 36% of the initial feed of $P_2O_5$, was fed at the rate of 0.95 l/hr into the second operational stage. A mixed solvent consisting of 84% by weight of isopropylether and 16% by weight of n-BuOH was fed countercurrently at a rate of 2.1 l/hr. The temperature of extraction was 18–20°C. For the acid release the extract was heated to 30°C and simultaneously water was fed to the extract at a rate of 0.36 l/hr. A clean acid of a concentration of 50% $H_3PO_4$ was obtained at a rate of 0.86 l/hr.

The final reject, obtained at a rate of 0.45 l/hr at a concentration of 47% by weight of $H_3PO_4$, constituted 36% of the residual acid from the first operation, i.e. only 13% of the initial $P_2O_5$ feed.

The total clean acid yield from both stages constituted 87% of the $H_3PO_4$ in the initial feed.

The clean acids contained only 0.05% of Fe, which indicates a high degree of purity.

EXAMPLE 6

This Example illustrates an operation where a small quantity of high purity phosphoric acid is obtained from a good quality technical-grade feed acid, without raising substantially the impurity level in the residual acid so that the latter can still be classified a good technical-grade acid. 100 g of feed acid containing 85% by weight of $H_3PO_4$ and 3000 ppm of Fe was contacted at room temperature in a separatory funnel with 75 g of a mixture of 90% by weight of di-n-butyl ether and 10% by weight of n-hexanol, to give 102 g of an extract containing 25% by weight of $H_3PO_4$, and 73 g of residual acid containing 81% by weight of $H_3PO_4$ and about 4000 ppm of Fe. The extract was heated to 80°C and during the heating 1 ml of water was added to prevent entrainment. The aqueous phase that separated was added to the residual acid. The hot extract was contacted with 8 g of $H_2O$ to yield 33 g of clean acid containing 75% by weight of $H_3PO_4$ (i.e. 30% yield on the feed) and 25 ppm of Fe.

We claim:

1. A process for extracting phosphoric acid from an aqueous starting solution thereof which comprises contacting said aqueous starting solution with a mixed solvent containing 75–95% by weight of at least one ether $R-O-R_1$ in which R and $R_1$ are the same or different aliphatic radicals having 2–5 carbon atoms and 5–25% by weight of at least one aliphatic alcohol having 3–8 carbon atoms, at a temperature low enough to form a clear homogeneous extract phase containing extracted phosphoric acid distinct from a residual aqueous phase, separating the extract phase from the aqueous phase, raising the temperature of the extract phase and adding sufficient water so that the extract separates into a lower aqueous layer containing phosphoric acid and an upper solvent layer, and separating the lower aqueous layer from the upper solvent layer.

2. Process according to claim 1, wherein the extraction temperature is within the range of −5° to 80°C.

3. Process according to claim 2, wherein the extraction temperature does not exceed 40°C.

4. A process according to claim 1, wherein said aqueous starting solution is technical-grade phosphoric acid.

5. A process according to claim 1, wherein said aqueous starting solution is a residual acid solution remaining after extraction of a technical-grade phosphoric acid with an ether $R-O-R_1$ in which R and $R_1$ are aliphatic radicals having 2–5 carbon atoms.

* * * * *